United States Patent [19]

Kanazawa et al.

[11] Patent Number: 5,416,753
[45] Date of Patent: May 16, 1995

[54] MAGNETO-OPTICAL DISK DRIVE SYSTEM WITH HEAD POSITION ADJUSTABILITY

[75] Inventors: Hiroshi Kanazawa; Shimpei Shinozaki; Suguru Takishima; Isao Okuda, all of Tokyo, Japan

[73] Assignee: Asahi Kogaku Kogyo Kabushiki Kaisha, Tokyo, Japan

[21] Appl. No.: 151,113

[22] Filed: Nov. 12, 1993

[30] Foreign Application Priority Data

Nov. 16, 1992 [JP] Japan .............................. 4-078733 U
Aug. 26, 1993 [JP] Japan .............................. 5-046493 U

[51] Int. Cl.⁶ .......................................... G11B 13/04
[52] U.S. Cl. ............................ 369/13; 360/114; 360/109; 369/75.1
[58] Field of Search ................. 369/13, 14, 75.1, 75.2, 369/77.1, 77.2, 78, 215, 244, 219; 360/114, 59, 99.02, 109, 105, 106

[56] References Cited

U.S. PATENT DOCUMENTS 5,078,471 1/1992 Takishima ..................... 369/44.16
5,191,562 3/1993 Hensing et al. ................. 369/13

FOREIGN PATENT DOCUMENTS 407191 1/1991 European Pat. Off. ............ 369/13
64-89054 4/1989 Japan .

*Primary Examiner*—Georgia Y. Epps
*Assistant Examiner*—Tan Dinh
*Attorney, Agent, or Firm*—Sanndler Greenblum & Bernstein

[57] ABSTRACT

A magneto-optical disk drive system is provided with a housing and a disk cartridge for housing a magneto-optical disk therein. The disk cartridge is insertable into the housing, an optical head is disposed in the housing for movement in a first radial direction of the magneto-optical disk on one side thereof. A magnetic head is disposed in the housing for movement in a second radial direction of the magneto-optical disk on an opposite side thereof, and a position sensor is coupled to the optical and magnetic heads, for detecting the relative position of the optical and magnetic heads. A first position adjuster disposed in the housing for aligning the first and second radial directions with each other, second position adjuster disposed in the housing for positionally aligning the optical head and the magnetic head with each other across the first and second radial directions, and third position adjuster is disposed in the housing for positionally adjusting the position sensor with respect to the optical head and the magnetic head along the first and second radial directions.

22 Claims, 13 Drawing Sheets

F I G. 12
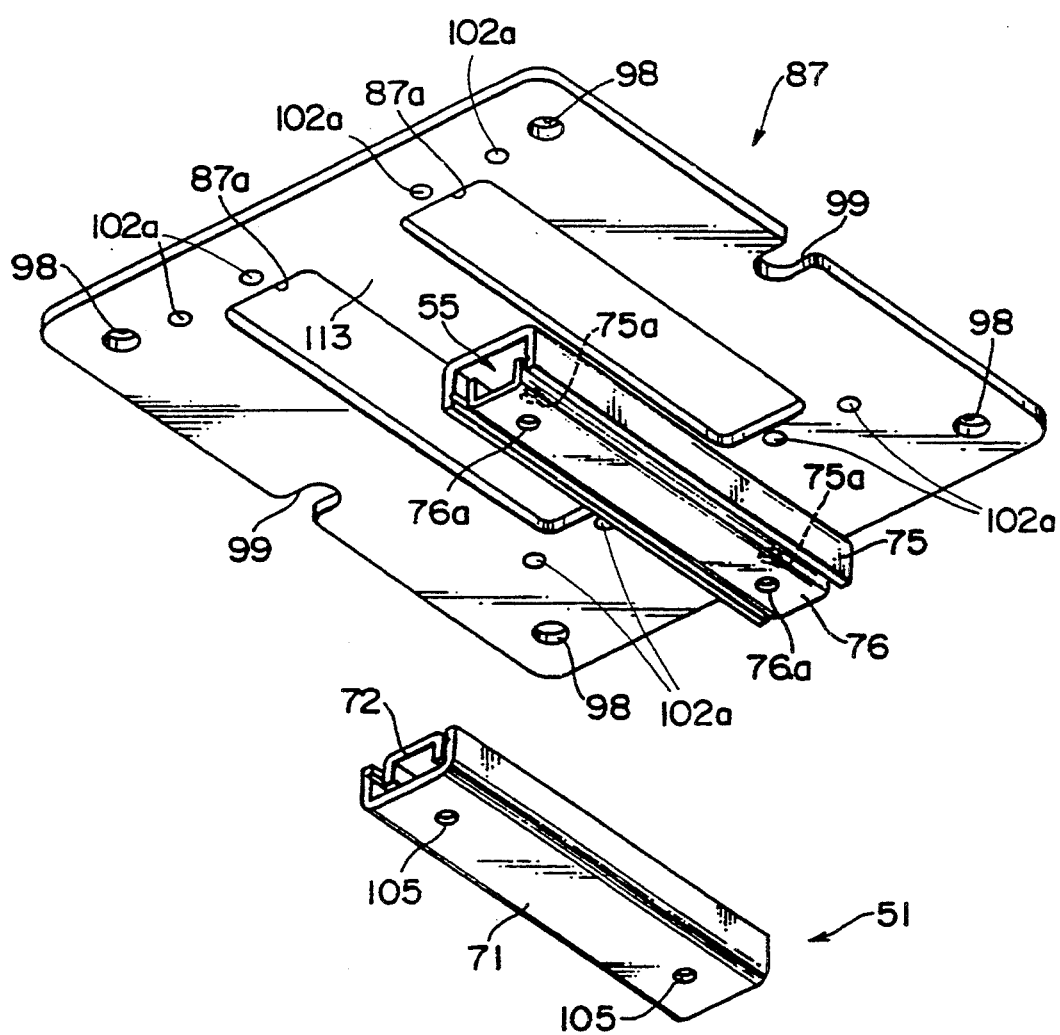

MAGNETO-OPTICAL DISK DRIVE SYSTEM WITH HEAD POSITION ADJUSTABILITY

BACKGROUND OF THE INVENTION

The present invention relates to a magneto-optical disk drive system, and more particularly to a position adjusting assembly for positionally adjusting magnetic and optical heads with respect to each other across a magneto-optical disk in a magneto-optical disk drive system.

Magneto-optical disk drive systems are capable of rewriting desired information many times on erasable magneto-optical disks. In such a magneto-optical disk drive system, a laser beam of large power, emitted from an optical head, is continuously applied to the recording layer on one surface of a loaded magneto-optical disk to heat small spots or bits on the magnet-optical disk to the Curie point. Then, a biasing magnetic field is applied to the spots by a biasing magnetic field generator or magnetic head to magnetically align the spots in an initial direction. Thereafter, the biasing magnetic field is reversed and a laser beam of large power is intermittently applied through the other surface of the magneto-optical disk to magnetically realign the spots, thus recording information.

The process of rewriting a track of information on a magneto-optical disk is relatively slow, because it is necessary to rotate the magneto-optical disk in both erasing and recording cycles. To eliminate this drawback, there has recently been proposed a magnetic-field-modulated overwrite magneto-optical disk drive system which selectively applies an N or S magnetic field to small spots on a magneto-optical disk where a laser beam is to be converged. The proposed magnetic-field-modulated overwrite magneto-optical disk drive system can rewrite one track of information on the magneto-optical disk simply by rotating the magneto-optical disk only once.

Quick overwriting on the magneto-optical disk requires that a magnetic field, modulated at high speed, be applied to the magneto-optical disk, and a small-size magnetic head be positioned very closely to the recording layer of tile magneto-optical disk. It is also necessary that the magnetic head over one surface of the magneto-optical disk be moved in unison with the optical head that is disposed over the other surface of the magneto-optical disk. To meet such a requirement, the magnetic and optical heads should be positioned in alignment with each other for applying the magnetic field and the laser beam, respectively, positionally accurately to the recording layer of the magneto-optical disk.

There is a need for a magneto-optical disk drive system having a structure that allows a magnetic head over one surface of a magneto-optical disk and an optical head over the other surface thereof to be positionally aligned with each other with ease and accuracy when the magneto-optical disk drive system is manufactured or serviced.

SUMMARY OF THE INVENTION

It is therefore an object of the present invention to provide a magneto-optical disk drive system with magnetic and optical heads that can easily and accurately be aligned with each other across a magneto-optical disk positioned between the magnetic and optical heads.

According to one aspect of the present invention, a magneto-optical disk drive system comprising a housing, a cartridge holder disposed in the housing, and a disk cartridge for housing a magneto-optical disk therein is provided. The disk cartridge is insertable in the cartridge holder. A optical head carriage is movably disposed in the housing and supports an optical head. A first linear motor is supported in the housing for moving the optical head carriage in a first radial direction of the magneto-optical disk on one side of said cartridge holder. A magnetic head carriage supports a magnetic head, and a second linear motor supported in the housing moves the magnetic head carriage in a second radial direction of the magneto-optical disk on an opposite side of the cartridge holder. A pair of first and second position sensors supported respectively by the magnetic and optical head carriages, detects the relative position of the magnetic and optical head carriages. A magnetic head carriage base is supported in the housing on the other side of the cartridge holder for movement toward and away from the cartridge holder, a base plate is adjustably supported to the magnetic, and a head carriage base. First position adjusting means positionally adjust the magnetic head carriage with respect to the base plate in order to align the optical head carriage and magnetic head carriage such that they move in the same direction. Second position adjusting means, for moving the base plate with respect to the magnetic head carriage base, moves the magnetic head carriage across the first and second directions as aligned by the first position adjusting means in order to coincide the first and second directions in which the magnetic head carriage and the optical head carriage move. Third position adjusting means moves the first position sensor with respect to the magnetic head carriage in order to vertically align the magnetic head and the optical head with each other.

According to another aspect of the present invention, there is also provided a magneto-optical disk drive system comprising a housing, and a disk cartridge for housing a magneto-optical disk therein. The disk cartridge is insertable into the housing. An optical head is disposed in the housing for movement in a first radial direction of the magneto-optical disk on one side thereof, and a magnetic head is disposed in the housing for movement in a second radial direction of the magneto-optical disk on an opposite side thereof. Position sensor means is coupled to the optical and magnetic heads, and detects the relative position of the optical and magnetic heads. First position adjusting means disposed in the housing, sets the first and second radial directions to be in parallel with each other. Second position adjusting means, also disposed in the housing, coincides the first and second radial directions with each other. Finally, third position adjusting means disposed in the housing, positionally adjusts the position sensor means with respect to the optical head and the magnetic head along the first and second radial directions.

DESCRIPTION OF THE ACCOMPANYING DRAWINGS

FIG. 12 is an exploded perspective view of the base plate and a linear bearing mounted thereon.

DESCRIPTION OF THE EMBODIMENT

Figure 1:
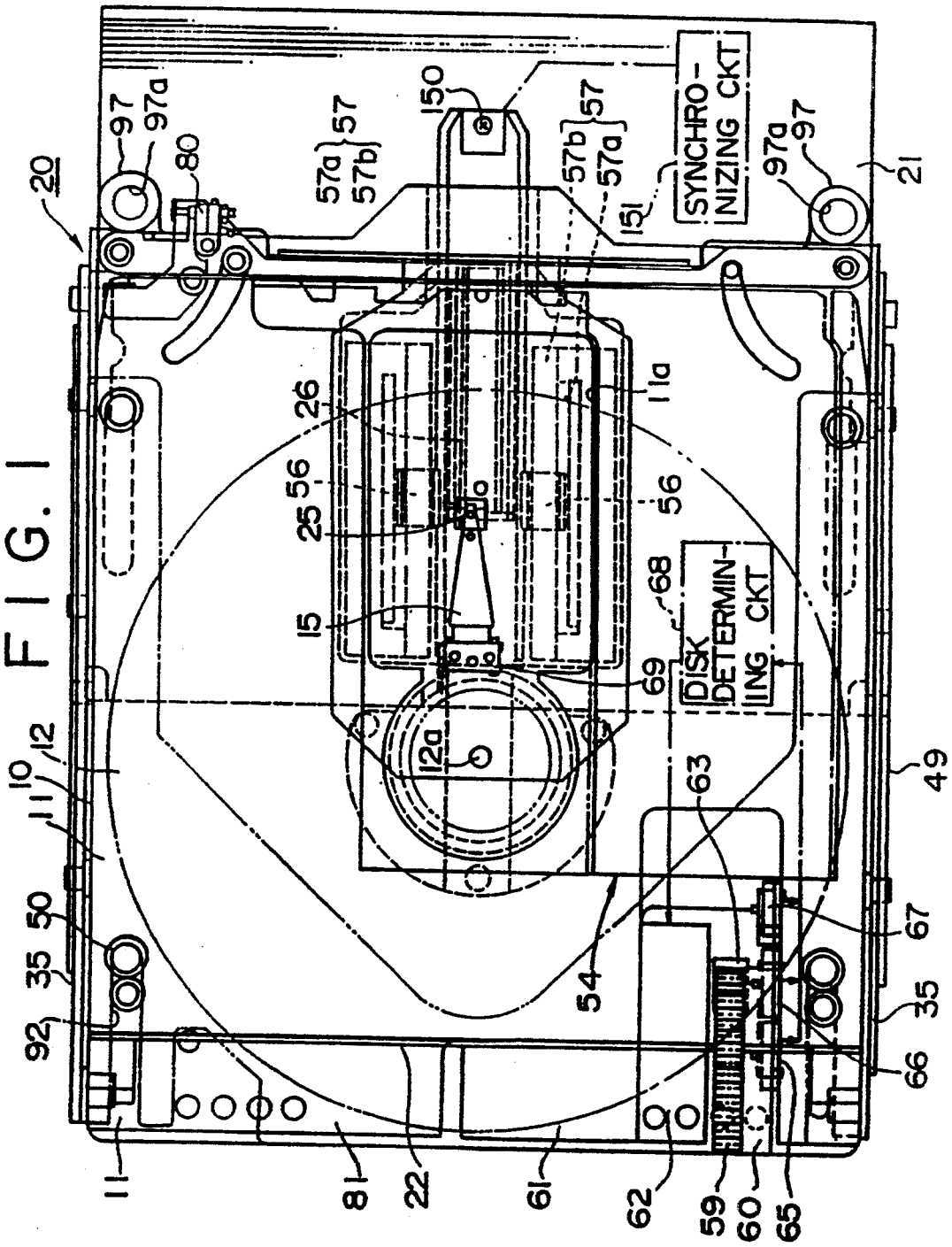
FIG. 1 is a plan view of the magneto-optical disk drive system.
Figure 2:
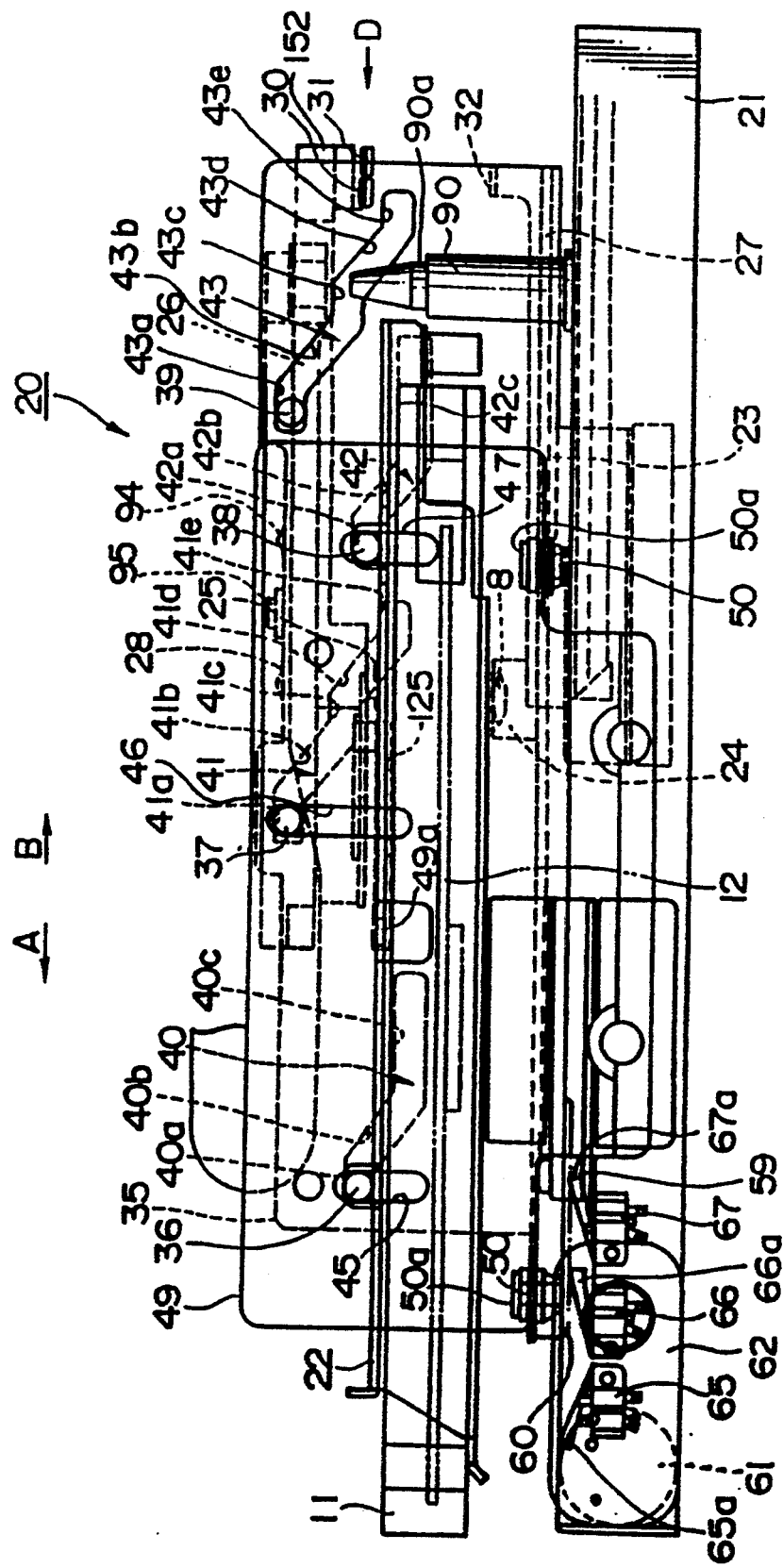
FIG. 2 is a side elevational view of a magneto-optical disk drive system with the parts in a disk cartridge inserting/ejecting mode.

As shown in FIGS. 1 and 2, a magnetic-field-modulated overwrite magneto-optical disk drive system 20, embodying the principles of the present invention, has a cartridge holder 22 for holding a disk cartridge 11 that has been loaded, with the disk cartridge 11 housing a magneto-optical disk 12 inserted therein. The cartridge holder 22 is movably disposed in a housing 10 of the magneto-optical disk drive system 20. The magneto-optical disk drive system 20 also includes an optical head base 21 supporting an optical head 24 for applying a laser beam to the magneto-optical disk 12 in the disk cartridge 11. In addition an optical head carriage 23 is provided for moving the optical head 24 radially with respect to the magneto-optical disk 12 in the disk cartridge 11 along a linear bearing 51 (see FIGS. 5 through 7) on the optical head base 21. A magnetic head 25 for applying a magnetic field to the magneto-optical disk 12, and a magnetic head carriage 26 is provided for moving the magnetic head 25 radially with respect to the magneto-optical disk 12 in the disk cartridge 11 along a linear bearing 55 (see FIGS. 5 through 7) on a magnetic head carriage base 28.

The magnetic head 25 is of the air floating type as shown in FIGS. 1 and 5 through 7. Specifically, a cantilevered flexible arm 15 has one end fastened by screws 69 to a lower surface of tile magnetic head carriage 26 closely to the center 12a of the magneto-optical disk 12. The magnetic head 25 is supported on the other end of the flexible arm 15 which is directed toward tile outer circumferential edge of the magneto-optical disk 12. When the magneto-optical disk drive system 20 is in a disk inserting/ejecting mode as shown in FIG. 2, the flexible arm 15 flexes or is inclined downwardly until it engages a magnetic head holder plate 70 (see FIGS. 9 and 10). When the magnetic head 25 is in a loading position (see FIG. 4), it is displaced upwardly under an air pressure developed by the magneto-optical disk 12 as it rotates, and held at a very small distance from the surface of the magneto-optical disk 12.

The disk cartridge 11 has a pair of head access windows 11a, 11b (see FIGS. 1 and 5 through 7) defined in its opposite spaced panels and a shutter 54 (see FIG. 1) which can selectively open and close the head access windows 11a, 11b.

A loading switch 80 is mounted on the rear end of the cartridge holder 22. The loading switch 80 can be turned on when tile disk cartridge 11 is inserted into the cartridge holder 22. When the loading switch 80 is turned on, a drive motor 61 (see FIGS. 1 and 2) is energized.

The optical head 24 is positioned below the cartridge holder 22, and the magnetic head 25 is positioned above the cartridge holder 22. The cartridge holder 22 is vertically movable toward and away from the optical head 24. When the disk cartridge 11 is inserted into or ejected from the cartridge holder 22, the cartridge holder 22 is located in an unloading position upwardly spaced from the optical head 24 as shown in FIG. 2. When the disk cartridge 11 together with the cartridge holder 22 is pushed into a certain position, the loading switch 80 is turned on by the cartridge holder 22 as described above, energizing the drive motor 61 to move the magneto-optical disk 12 housed in the disk cartridge 11 into a loading position close to the optical head 24 as shown in FIG. 4.

The magneto-optical disk drive system 20 has a pair of laterally spaced vertical guide cam plates 35 positioned one on each side of the cartridge holder 22. The guide cam plates 35 are guided by guide rollers 50 on the optical head base 21 for sliding movement in the direction indicated by the arrow A or B (FIG. 2). The guide cam plates 35 are connected to each other by a horizontal connecting plate 81 (FIG. 1) extending beneath the cartridge holder 22.

Each of the guide cam plates 35 has inclined crank-shaped cam grooves 40, 42 defined therein for guiding the cartridge holder 22, inclined crank-shaped cam grooves 41, 43 for guiding the magnetic head 25, and a horizontal slot 125. The magneto-optical disk drive system 20 also has a pair of laterally spaced vertical fixed cam plates 49 fastened to the housing 10 and positioned outwardly of the guide cam plates 35, respectively. Each of the fixed cam plates 49 has three vertical cam grooves 45, 47. 46 defined therein across the cam grooves 40, 42, 41, respectively, in the corresponding guide cam plate 35 for vertically guiding the cartridge holder 22 and the magnetic head 25.

Figure 3:
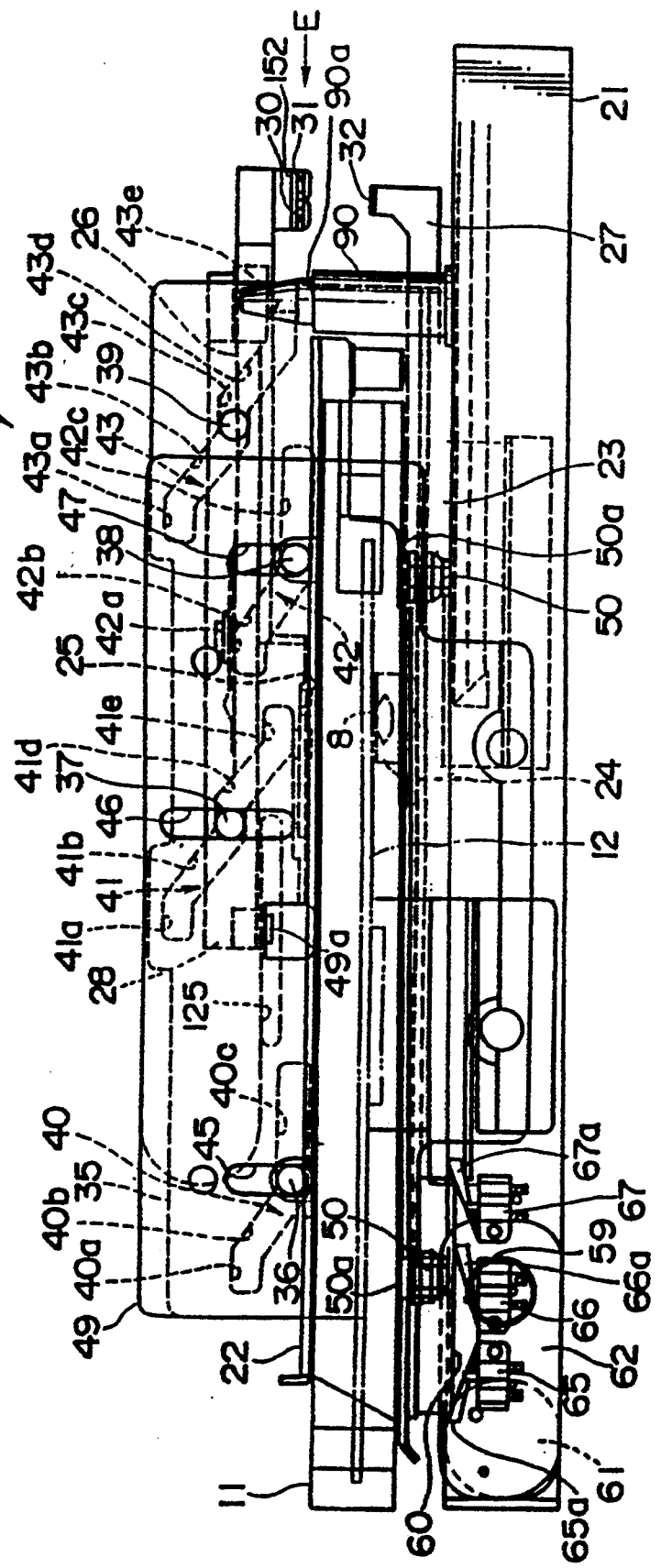
FIG. 3 is a side elevational view of the magneto-optical disk drive system with the parts in a reproducing mode.
Figure 4:
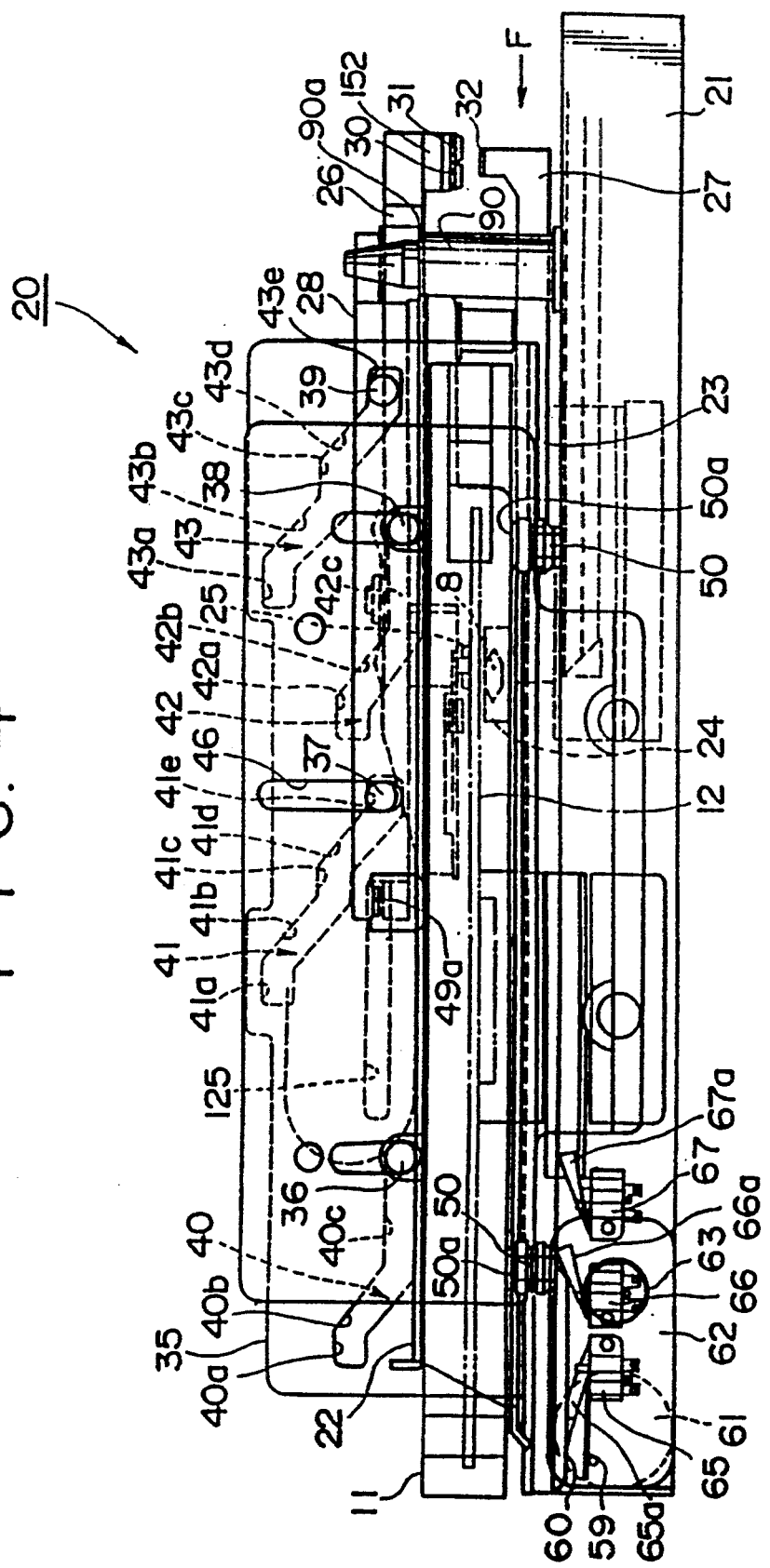
FIG. 4 is a side elevational view of the magneto-optical disk drive system with the parts in a recording/reproducing mode.

As shown in FIGS. 2 through 4, each of the fixed cam plates 49 also has a horizontal raised abutment finger 49a positioned substantially centrally thereon and projecting horizontally through the horizontal slot 125 inwardly through the corresponding guide cam plate 35. The fingers 49a of the fixed cam plates 49 serve to engage respective laterally spaced abutments 110 of the magnetic head carriage base 28 shown in FIG. 9 when the magnetic head carriage base 28 is lowered. Therefore, the fingers 49a define a lower position for the magnetic head carriage base 28. The magnetic head carriage 26 is movably supported on the magnetic head carriage base 28.

The cartridge holder 22 has a pair of cam pins 36, 38 projecting laterally outwardly from each of vertical side panels thereof which extend vertically near the respective guide cam plates 35 and the respective fixed cam plates 49. The cam pin 36 of one of the side panels of the cartridge holder 22 extends through the cam groove 40 In the corresponding guide cam plate 35 and the cam groove 45 in tile corresponding fixed cam plate 49, and the cam pin 38 of one of the side panels of the cartridge holder 22 extends through the cam groove 42 in the corresponding guide cam plate 35 and the cam groove 47 in the corresponding fixed cam plate 49.

The magnetic head carriage base 28 has a pair of cam pins 37, 39 projecting laterally outwardly from each of vertical side panels thereof. The cam pin 37 of one of the side panels of the magnetic head carriage base 28 extends through the cam groove 41 in the corresponding guide cam plate 35 and the cam groove 46 in the corresponding fixed cam plate 49, and the cam pin 39 extends through the cam groove 43 in the corresponding guide cam plate 35.

The cam grooves 40, 42 include respective horizontal unloading portions 40a, 42a for holding the respective cam pins 36, 38 therein to keep the cartridge holder 22, i.e., the disk cartridge 11, in the unloading position, respective slanted transfer portions 40b, 42b extending from tile unloading portions 40a, 42a for guiding the respective cam pins 36, 38 upon initial movement of the guide cam plates 35 to move tile disk cartridge 11 from the unloading position to the loading position, and respective horizontal loading portions 40c, 42c extending from the transfer portions 40b, 42b for holding the disk cartridge 11 in the loading position. The loading portions 40c, 42c are horizontally elongated so that the cam pins 36, 38 can move in and along these loading portions 40c, 42c without vertical movement while the guide cam plates 35 are horizontally moving with respect to the fixed cam plates 49.

The cam grooves 41, 43 include respective horizontal unloading portions 41a, 43a for holding the respective cam pins 37, 39 therein to keep the magnetic head carriage 26 and hence the magnetic head 25 in an unloading position remote from the cartridge holder 22, respective slanted transfer portions 41b, 43b extending from the unloading portions 41a, 43a for guiding the respective cam pins 37, 39 upon initial movement of the guide cam plates 35 to move the magnetic head 25 obliquely downwardly from the unloading position, respective horizontal intermediate portions 41c, 43c extending from the transfer portions 41b, 43b for holding the respective cam pins 37, 39 therein to keep tile magnetic head 25 in an intermediate or standby position positioned below the unloading position, respective slanted transfer portions 41d, 43d extending from the intermediate portions 41c, 43c for guiding the respective cam pins 37, 39 upon subsequent movement of the guide cam plates 35 to move tile magnetic head 25 obliquely downwardly from the intermediate position, and horizontal loading portions 41e, 43e extending from the transfer portions 41d, 43d for holding the respective cam pins 37, 39 therein to keep the magnetic head 25 in a loading position positioned near the cartridge holder 22 below the intermediate position. The intermediate position lies vertically between the unloading and loading positions.

As shown in FIG. 1, the connecting plate 81 supports a rack 59 and a switch trigger plate 60 which are fixedly mounted thereon. The drive motor 61 is mounted on the housing 10, which also supports a gearbox 62 for transmitting rotation of the drive motor 61 through a pinion 63 to the rack 59. Thus, when the drive motor 61 is energized, the rack 59 moves linearly.

As shown in FIGS. 1 through 4, the housing 10 supports first, second, and third detecting switches 65, 66, 67 thereon which have respective switch levers 65a, 66a, 67a. When the respective switch levers 65a, 66a, 67a are pressed or released by the switch trigger plate 60, which moves in accordance with the guide cam plates 35, the first, second, and third detecting switches 65, 66, 67 are turned on or off, thus detecting the position of the guide cam plates 35 with respect to the housing 10, and hence determining the present position of the disk cartridge 11 and the magnetic head carriage base 28 with respect to the housing 10.

More specifically, the switch trigger plate 60 may turn off the first detecting switch 65 and turn on the second and third detecting switches 66, 67 when the parts are in the position shown in FIG. 2, may turn off both the first and third switches 65, 67 and turn on the second switch 66 when the parts are in the position shown in FIG. 3, and may turn on the first detecting switch 65 and turn off tile second and third detecting switches 66, 67 when the parts are in the position shown in FIG. 4.

The first, second, and third detecting switches 65, 66, 67 produce and supply their bit signals to a determining circuit (not shown). Based on the supplied bit signals, the determining circuit determines whether the magnetic head 25 and the disk cartridge 11 are in the respective unloading positions allowing the disk cartridge 11 to be inserted into and ejected from the cartridge holder 22 in a disk inserting/ejecting mode (see FIG. 2), or the disk cartridge 11 is in the loading position and the magnetic head 25 is in the intermediate position allowing recorded information to be reproduced from the magneto-optical disk 12 by the optical head 24 in a reproducing mode (see FIG. 3), or the magnetic head 25 and the disk cartridge 11 are in the respective loading positions allowing information to be recorded on and reproduced from the magneto-optical disk 12 in a recording-/reproducing mode (see FIG. 4).

The magneto-optical disk 12 can record, for example on an inner control track, an optical code signal indicative of whether the magneto-optical disk 12 is double-sided or single-sided. The optical code signal recorded on the magneto-optical disk 12, which is inserted in the magneto-optical disk drive system 20, is read by the optical head 24 when the magneto-optical disk drive system 20 is in the reproducing mode shown in FIG. 3. Based on the optical code signal read by the optical head 24, a disk determining circuit 68 (see FIG. 1) determines whether the inserted magneto-optical disk 12 is double-sided or single-sided. If the magneto-optical disk 12 is double-sided, then the guide cam plates 35 are not moved and hence the magnetic head 25 is not moved from the Intermediate position, and desired information is read from the magneto-optical disk 12 by tile optical head 24. If the magneto-optical disk 12 is single- sided, then the drive motor 61 is further energized to move the guide cam plates 35 to bring the magnetic head 25 from the Intermediate position Into the loading position in which information can be recorded on and reproduced from the magneto-optical disk 12.

Figure 5:
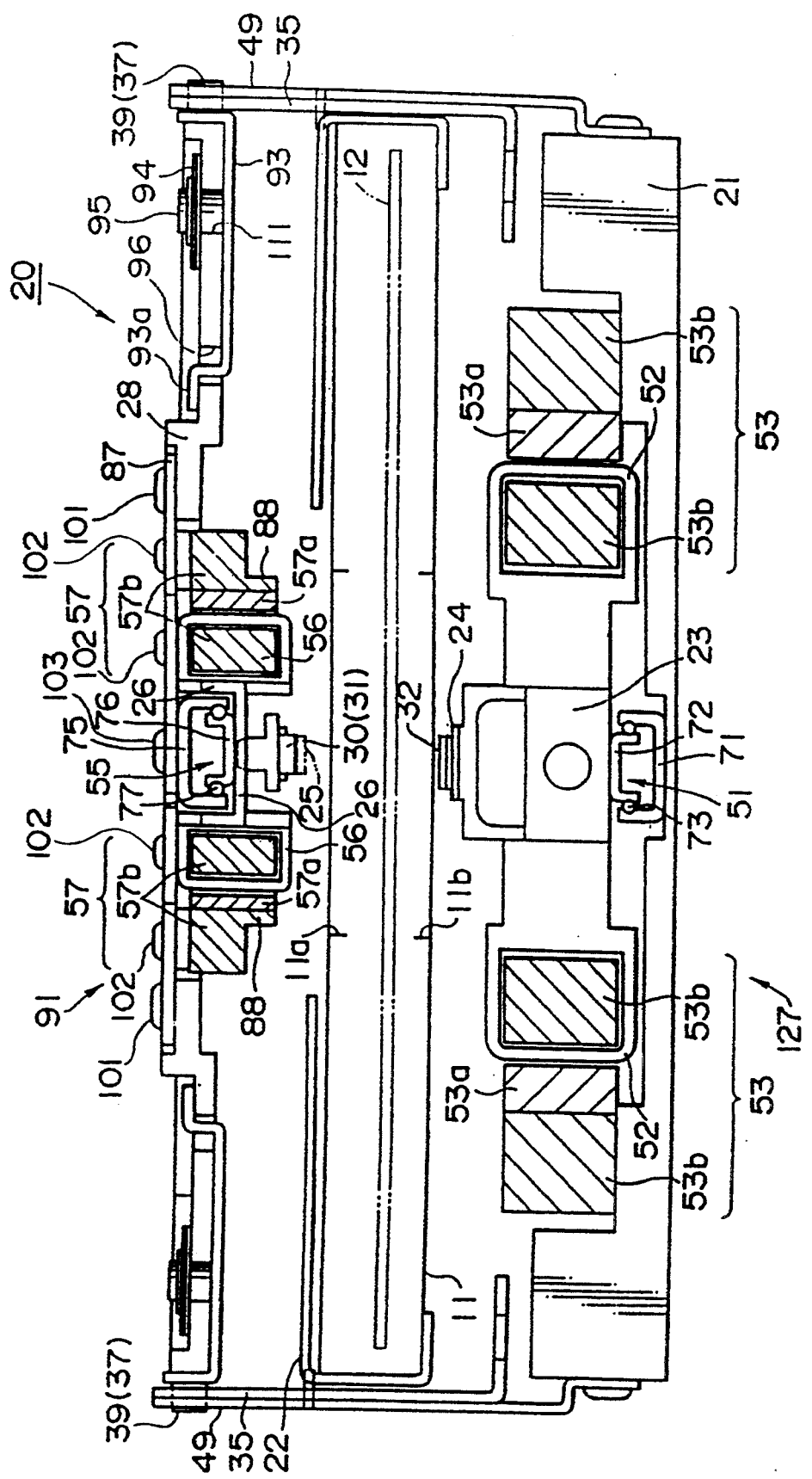
FIG. 5 is a rear elevational view of the magneto-optical disk drive system shown in FIG. 2 as viewed in the direction indicated by the arrow D in FIG. 2.
Figure 6:
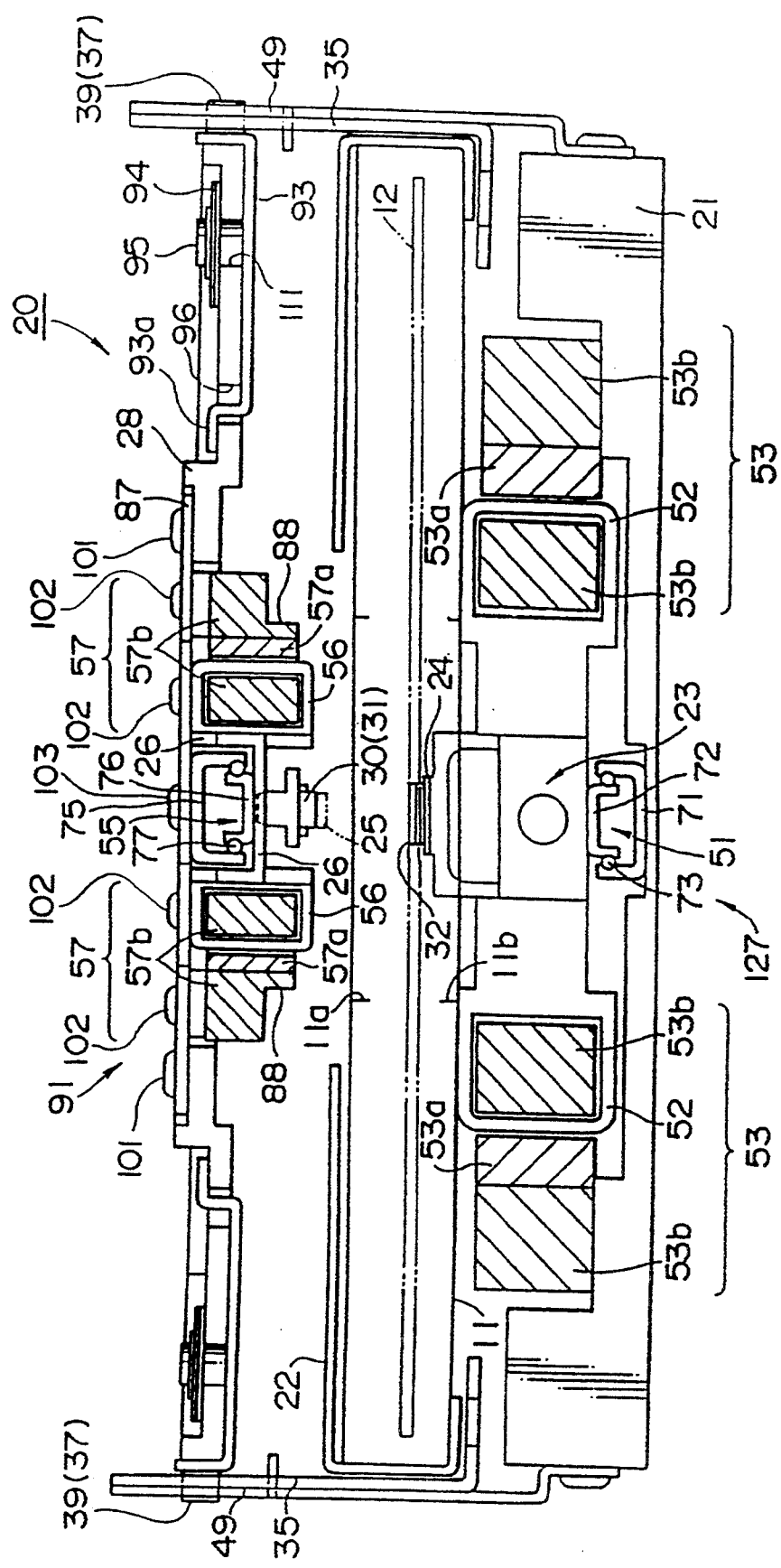
FIG. 6 is a rear elevational view of the magneto-optical disk drive system shown in FIG. 3 as viewed in the direction indicated by the arrow E in FIG. 3.
Figure 7:
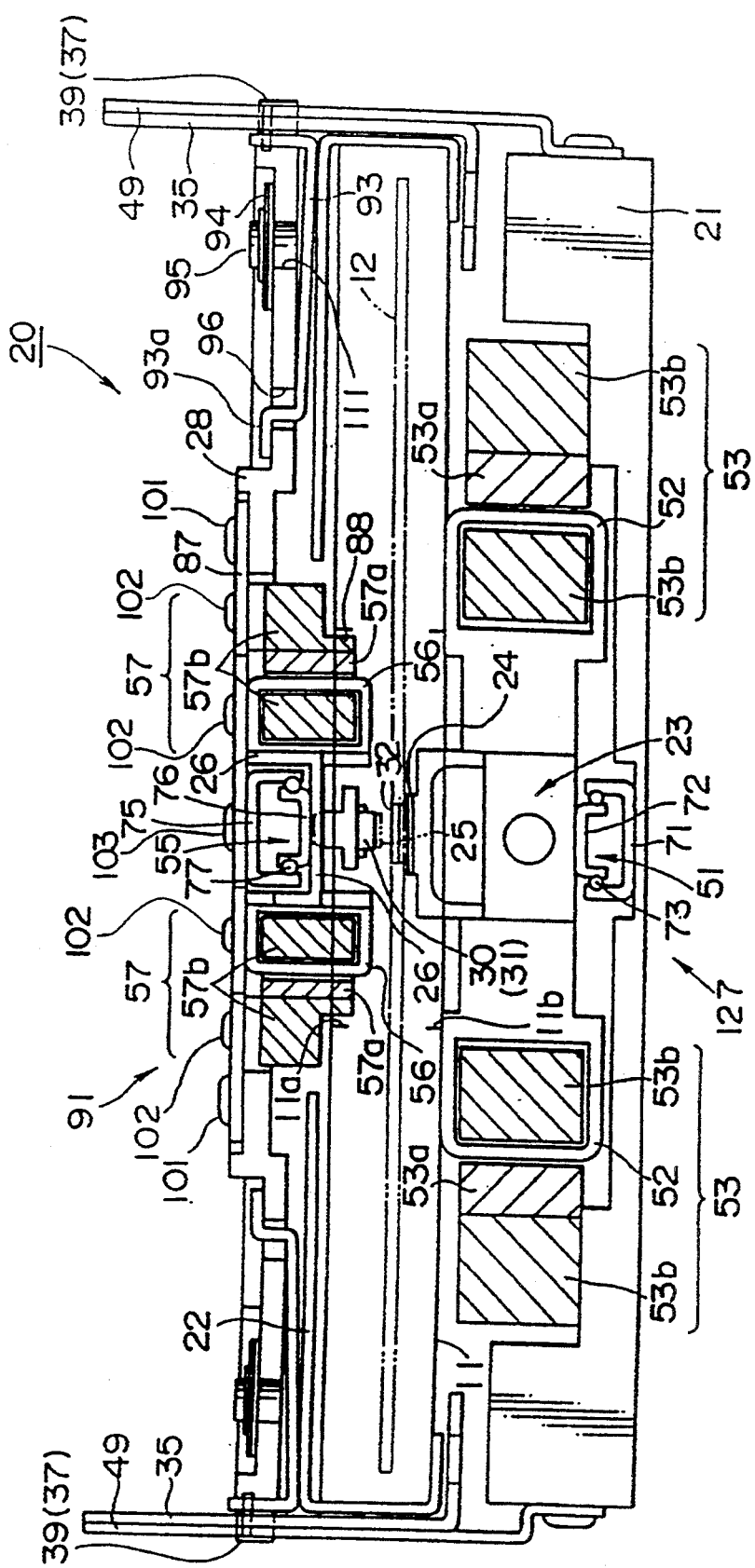
FIG. 7 is a rear elevational view of the magneto-optical disk drive system shown in FIG. 4 as viewed in the direction indicated by the arrow F in FIG. 4.

As shown in FIGS. 5 through 7, the optical head carriage 23 and the optical head 24 are actuatable radially with respect to the magneto-optical disk 12 by a 11near motor 127, and the magnetic head carriage 28 and hence the magnetic head 25 are actuatable radially with respect to the magneto-optical disk 12 by a linear motor 91.

The optical head carriage 23 is supported by the linear bearing 51 for movement in the radial direction of the magneto-optical disk 12 to bring the optical head 24 to a desired track on the magneto-optical disk 12. The linear motor 127 comprises a pair of coils 52 fixed to opposite ends of tile optical head carriage 23 and disposed around portions of respective magnetic circuits 53. Specifically, each of the magnetic circuits 53 comprises a permanent magnet 53a and a pair of yokes 53b spaced from each other, the permanent magnet 53a being positioned between the yokes 53b held against one of the yokes 53b. The coil 52 is disposed around the yoke 53b which is spaced from the permanent magnet 53a.

The linear bearing 51 comprises a fixed member 71, a linear slider 72, and a plurality of balls 73 interposed rollingly between the fixed member 71 and the linear slider 72. The linear bearing 51 is assembled prior to positional adjustments (described later on) of the optical head 24. The fixed member 71 comprises a substantially channel-shaped elongated member attached to the optical head base 21. The linear slider 72 also comprises a substantially channel- shaped elongated member attached to the optical head carriage 23, the linear slider 72 being narrower than the fixed member 71. The fixed member 71 and the linear slider 72 have grooves defined in confronting surfaces thereof, and the balls 73 rollingly ride in these grooves.

The optical head 24, supported on the optical head carriage 23, has an objective for focusing a laser beam emitted from a laser beam source onto the magneto-optical disk 12. When recorded information is to be reproduced from the magneto-optical disk 12, the optical head 24 detects a laser beam reflected from the magneto-optical disk 12 and reads a magneto-optically recorded signal from the detected laser beam. When information is to be recorded on the magneto-optical disk 12, the optical head 24 applies a laser beam of greater power than the laser beam applied when recorded information is reproduced from the magneto-optical disk 12, thereby heating the recording layer of the magneto-optical disk 12 to the Curie point, and cooperates with the magnetic head 25 in overwriting the recording layer with the information.

The magnetic head carriage 26 is supported by the linear bearing 55 mounted on the magnetic head carriage base 28 for movement in the radial direction of the magneto-optical disk 12 to bring the magnetic head 25 to a desired track on the magneto-optical disk 12. The llnear motor 91 comprises a pair of coils 56 fixed to opposite ends of the magnetic head carriage 26 and disposed around portions of respective magnetic circuits 57.

Specifically, each of the magnetic circuits 57 comprises a permanent magnet 57a and a pair of yokes 57b spaced from each other, the permanent magnet 57a being positioned between the yokes 57b and held against one of the yokes 57b. The coil 56 is disposed around the yoke 57b which is spaced from the permanent magnet 57a. The yokes 57b have lower thinner portions 88 that are held against the permanent magnets 57a. When the magnetic head 25 is lowered into the loading position, as shown in FIG. 7, the lower thinner portions 88 of the yokes 57b are partly placed in the upper head access window 11a of the disk cartridge 11.

The linear bearing 55 comprises a fixed member 75, a linear slider 76, and a plurality of balls 77 interposed rollingly between the fixed member 75 and the linear slider 76. The fixed member 75 comprises a substantially channel- shaped elongate member attached to the magnetic head carriage base 28. The linear slider 76 comprises a substantially channel-shaped elongate member attached to the magnetic head carriage 26, the linear slider 76 being narrower than the fixed member 75. The fixed member 71 and the linear slider 76 have grooves defined in confronting surfaces thereof, and the balls 77 rollingly ride in these grooves.

As shown in FIG. 2, two reflective photosensors or photo-interrupters 30, 31 each composed of a light-emitting element and a light-detecting element are mounted on an end of the magnetic head carriage 26 by a sensor attachment base 152. The optical head carriage 23 has a reflecting plate holder 27 extending in the direction in which the optical head carriage 23 is movable. The reflecting plate holder 27 supports a reflecting plate 32 thereon which faces upwardly toward the photosensors 30, 31. The reflective photosensors 30, 31 and the reflecting plate 32 jointly serve as a pair of position sensors. The optical and magnetic head carriages 23, 26 are relatively positioned such that the optical and magnetic heads 24, 25 are vertically aligned with each other across the magneto-optical disk 12 along the radial direction thereof when output signals produced from the light-detecting elements of the respective photosensors 30, 31 are equal to each other.

The optical head carriage 23 is actuatable in the radial direction of the magneto-optical disk 12 based on a signal from a controller (not shown). The magnetic head carriage 26 is positionally controlled by a synchronizing circuit 151 (see FIG. 1) so that the output signals produced from the light-detecting elements of the respective photosensors 30, 31 are equalized to each other. In this manner, the magnetic head carriage 26 can be moved in synchronism with the optical head carriage 23.

Figure 9:
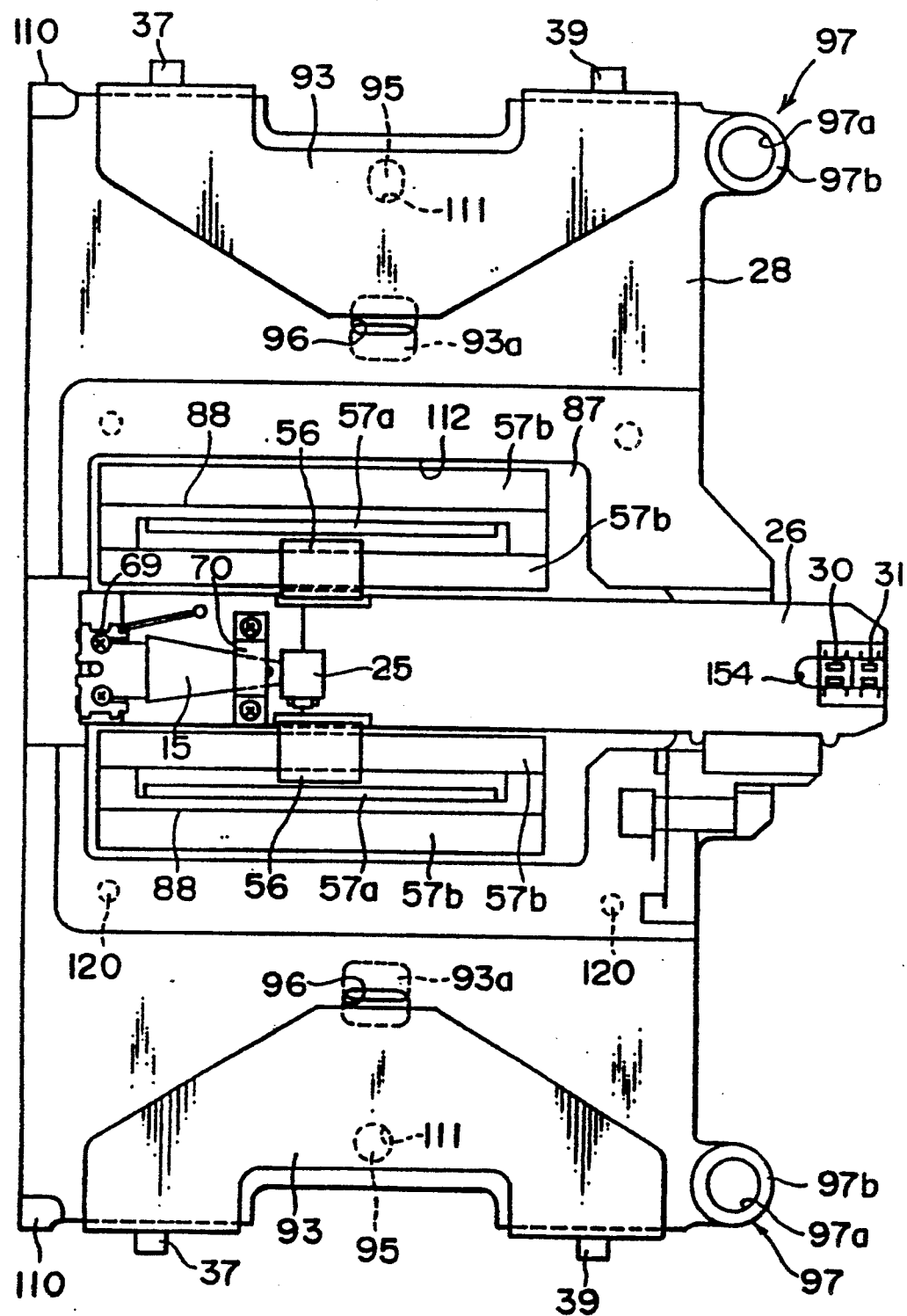
FIG. 9 is a bottom view of a magnetic head base, showing the first and second adjusters.

The sensor attachment base 152 is fastened to the magnetic head carriage 26 by a screw 150 which is inserted into a screw hole (not shown) formed to the sensor attachment base 152 through an elongated hole 154 formed to the magnetic head carriage 26 as shown in FIG. 9. The elongated hole 154 is formed to extend in the moving direction or longitudinal direction of the linear bearing 55. When the screw 150 is loosened, the sensor attachment base 152 can be moved longitudinally of the magnetic head carriage 26, i.e., radially of the magneto-optical disk 12. Therefore, with the magnetic head 25 and the optical head 24 positionally aligned with each other across the magneto-optical disk 12 along the radial direction thereof, the reflective photosensors 30, 31 can be positionally adjusted with respect to the reflecting plate 32 on the distal end of the reflecting plate holder 27.

The screw 150, the sensor attachment base 152 and the elongated hole 154 Jointly serve as a third position adjuster for adjusting the position of the position sensors 30, 31 with respect to the magnetic head carriage 26 in order to align the magnetic head 25 and the optical head 24 vertically along the radial direction of the magneto-optical disk 12 as detected by both the position sensors 30, 31.

That is, the third position adjuster is provided to vertically align the positions of the heads 24 and 25 with each other. It should be noted that the adjusting of the heads 24 and 25 is accomplished by alternately executing the adjusting operation of the third position adjuster, and of a second position adjuster as mentioned later in detail.

Figure 8:
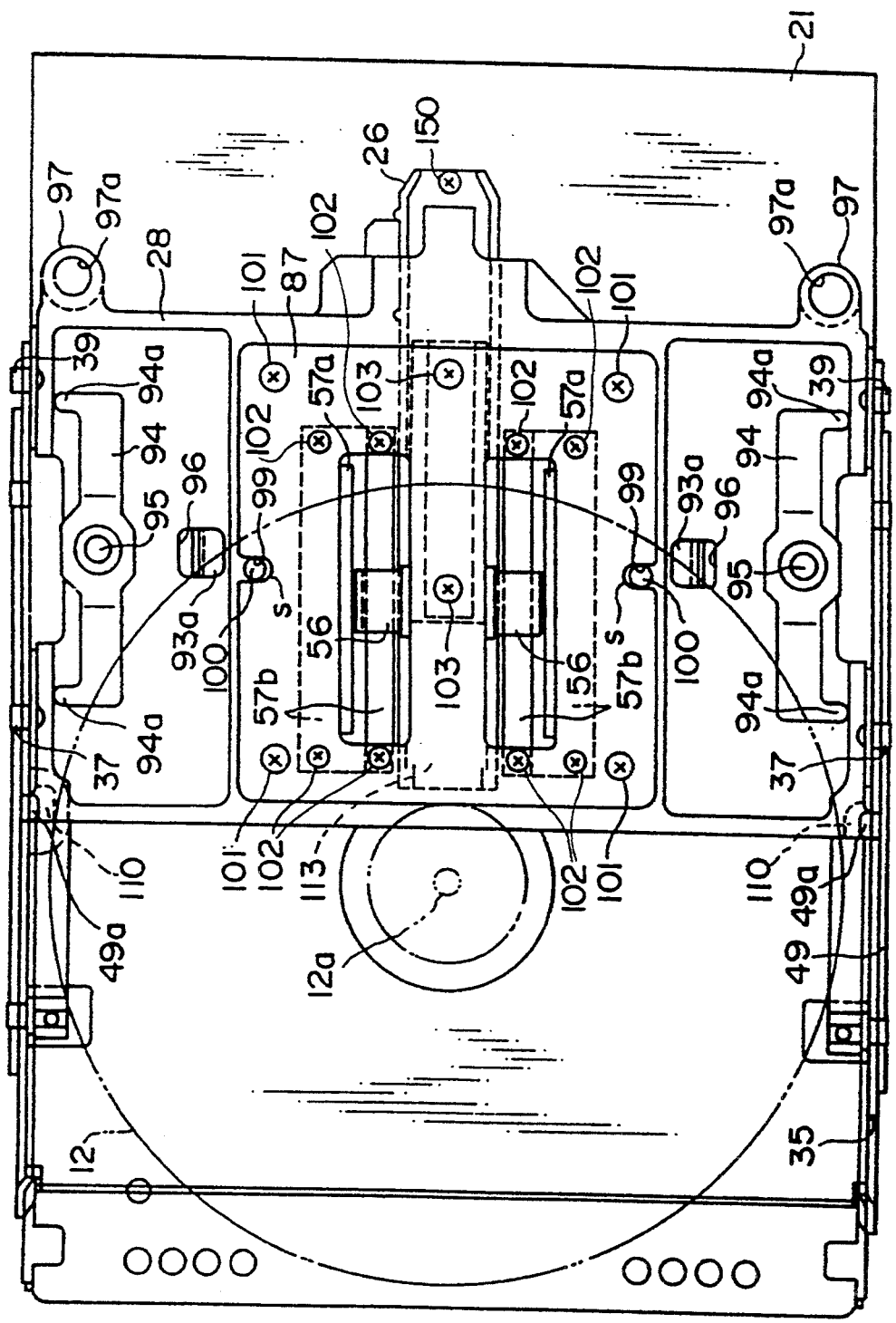
FIG. 8 is a plan view showing first, second, and third adjusters of the magneto-optical disk drive system.

As shown in FIG. 8, the magnetic head carriage base 28 is off a substantially rectangular shape as viewed in plan, with the abutments 110 mounted on respective laterally spaced front corners thereof. The magnetic head carriage base 28 has a pair of positioning arms 97 projecting rearwardly from respective laterally spaced rear corners thereof and having a pair of respective positioning holes 97a defined therein. The magnetic head carriage base 28 also has a central rectangular opening 112 (see FIG. 9) defined therein and smaller than a rectangular base plate 87 (described later on) mounted on the magnetic head carriage base 28. The positioning arms 97 have respective lower engaging surfaces 97b (see FIG. 9) for engaging limiting shoulders 90a (see FIGS. 2 through 4) of respective stopper pins 90 that project upwardly from the optical head base 21. The limiting shoulders 90a and the abutment finger 49a jointly serve as a stopper for stopping the magnetic head carriage base 28 in a position closest to the magneto-optical disk 12.

As shown in FIG. 9, a pair of pre-loaded plates 93 is attached to respective laterally spaced marginal edge portions of a lower surface of the magnetic head base 28. The cam pins 37, 39 are mounted on outer sides of the pre-loaded plates 93. The pre-loaded plates 93 have respective engaging fingers 93a projecting upwardly from respective inner sides thereof, and respective studs 95 projecting upwardly from respective central portions thereof.

The magnetic head base 28 has a pair of rectangular holes 96 defined therein through which the engaging fingers 93a extend, the engaging fingers 93a having bent ends held against the upper surface of the magnetic head base 28, as shown in FIGS. 5 through 7. The magnetic head base 28 also has a pair of circular holes 111 defined therein near its outer sides through which the studs 95 extend. After the studs 95 are inserted through the respective circular holes 111, pre-loaded leaf springs 94 are set on the studs 95 over the magnetic head base 28. Specifically, holes defined in the respective pre-loaded leaf springs 94 are fitted over the respective studs 95, and then E-rings or other retainers are snapped on the respective studs 95 over the pre-loaded leaf springs 94 to connect the pre-loaded leaf springs 94 to the studs 95.

As shown in FIG. 8, each of the pre-loaded leaf springs 94 is of an elongate shape and has a pair of positioning teeth 94a projecting to one side from respective longitudinal ends thereof. As shown in FIG. 2, each of the pre-loaded leaf springs 94 has a pair of upwardly convex portions near the respective longitudinal ends thereof. Therefore, when the pre-loaded plates 93 and the pre-loaded leaf springs 94 are mounted on the lower and upper surfaces, respectively, of the magnetic head base 28, the pre-loaded plates 93 and hence the cam pins 37, 39 are normally biased upwardly under upwardly biasing forces that are applied from the pre-loaded leaf springs 94 through the respective studs 95.

As shown in FIG. 12, tile base plate 87 has a pair of parallel spaced rectangular openings 87a extending parallel to the direction in which the magnetic head carriage 26 is movable, and a pair of outwardly open guide recesses 99 defined in respective side edges thereof. The openings 87a extend perpendicularly to a straight line passing through the guide recesses 99. The base plate 87 also includes a positioning portion 113 which lies between the openings 87a and to which the fixed member 75 of the linear bearing 55 is fixed. The fixed member 75 has a pair of longitudinally spaced screw holes 75a defined therein, and the positioning portion 113 has a pair of longitudinally spaced position adjusting holes 113a (see FIG. 13) defined therein in registry with the respective screw holes 75a.

Figure 11:
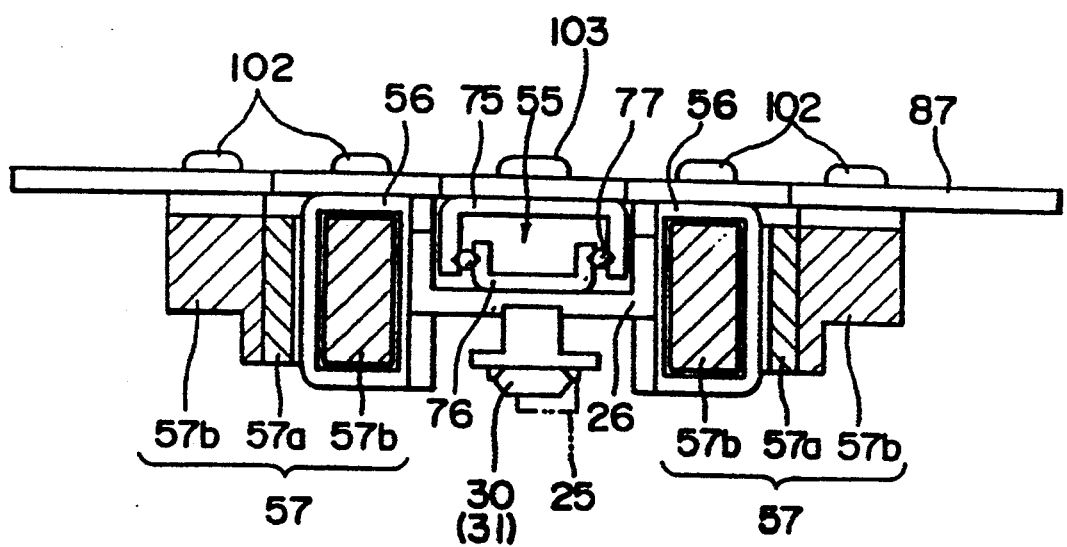
FIG. 11 is a rear elevational view of the linear motor shown in FIG. 20 as viewed in the direction indicated by tile arrow G in FIG. 20.

The fixed member 75 is fastened to the base plate 87 by a pair of screws 103 (see FIGS. 8 and 11) extending through tile position adjusting holes 113a threadedly into the respective screw holes 75a. The position adjusting holes 113a are smaller In diameter than the heads of the screws 103 and larger in diameter than the screw holes 75a. The linear slider 76 of the linear bearing 55 is fastened to the magnetic head carriage 26 by screws (not shown) that are threaded in respective screw holes 76a defined in the linear slider 76.

Figure 13:
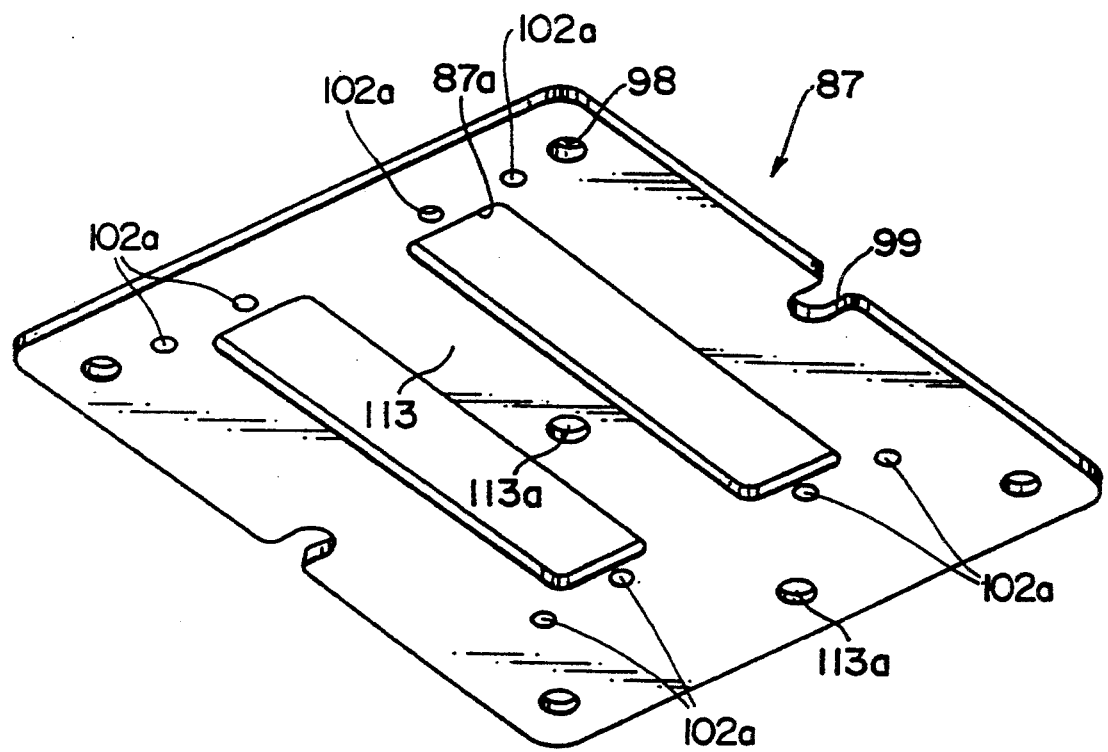
FIG. 13 is a perspective view of the base plate.

As seen in FIG. 12 and FIG. 13, the position adjusting holes 113a, the screws 103, and the screw holes 75a jointly serve as a first position adjuster for adjusting the position of the magnetic head carriage 26 with respect to the base plate 87 in order to align the head carriages 23, 26 such that they move in the same direction, i.e., to make the head carriages 23, 26 and hence the linear bearings 51, 55 parallel to each other.

That is to say, in the first position adjuster, an adjustable range of the linear bearing 55 at the mounting thereof is defined by radial clearances of the two position adjusting holes 113a and screws 103, and the position of the linear bearing 55 is to be arbitrarily adjusted in the two dimensions within the radial clearances. The linear bearing 55 is then fixed to the optical head base 21 by fastening the screws 103 once after the moving direction (i.e., the longitudinal direction ) of the 1 1near bearing 55 was adjusted to be aligned with the moving direction (i.e., the longitudinal direction) of the 1 1near bearing 51 of the optical head carriage 23.

More specifically, the 1 1near bearing 51 for the optical head 24 is mounted to the optical head base 21 with reference to the right side surface of the optical head base 21 as a reference surface, so as to be parallel thereto. On the other hand, the linear bearing 55 for the magnetic head 25 is also mounted to the magnetic head base 28 with reference to the right side surface of the optical head base 21, so as to be parallel thereto, by using an auto-collimator, etc. Accordingly, in the embodiment, the moving direction of the linear bearing 51 for the optical head 24 is set to be aligned with the moving direction of the linear bearing 55 for the magnetic head 25 by the first position adjuster.

In FIG. 12, the fixed member 71 of the linear bearing 51 which is fixed to the optical head base 21 has a pair of screw holes 105 defined therein in which screws (not shown) are threaded, thus fastening the fixed member 71 to the optical head base 21.

Figure 10:
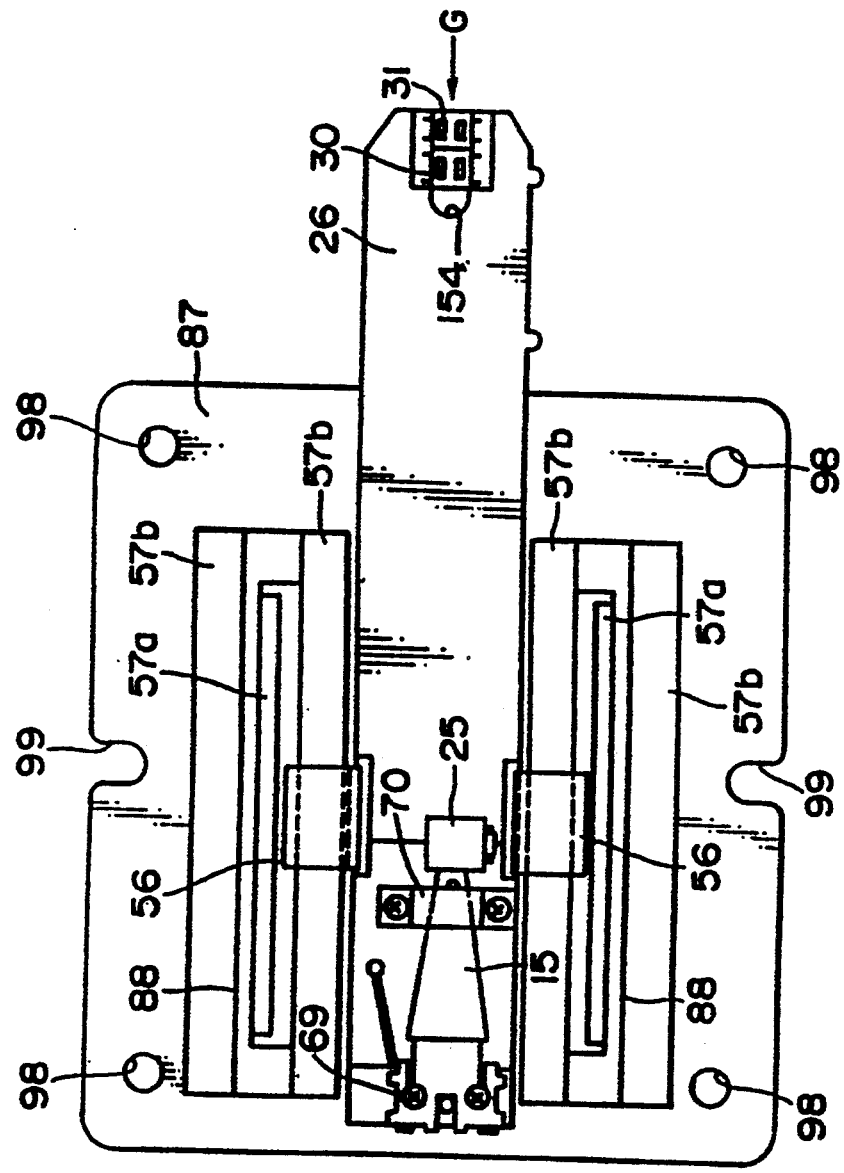
FIG. 10 is a bottom view of a base plate and a linear motor mounted on the base plate for moving a magnetic head.

As shown in FIGS. 10, 12, and 13, the base plate 87 has position adjusting holes 98 defined in respective corners thereof. The magnetic head carriage base 28 has screw holes 120 (see FIG. 9) defined therein around the opening 112 in registry with the position adjusting holes 98. Screws 101 (see FIG. 8) extend through the position adjusting holes 98 threadedly into the screw holes 120, thus fastening the base plate 87 to the magnetic head carriage base 28. The magnetic head carriage base 28 also has a pair of guide pins 100 projecting upwardly at positions laterally of the opening 112. The guide pins 100 engage slidably in the respective guide recesses 99 of the base plate 87 for guiding the base plate 87 in the longitudinal direction of the magnetic head carriage base 28.

As shown in FIG. 8, the base plate 87 is normally positioned with respect to the magnetic head carriage base 28 such that gaps or clearances s are created between the inner edges of the guide recesses 99 and the guide pins 100 received therein. The screws 101, the position adjusting holes 98, the guide recesses 99, and the guide pins 100 Jointly serve as a second position adjuster for adjusting the position of the base plate 87 relatively to the magnetic head carriage base 28 to move the magnetic head carriage 26 across the directions, as paralleled by the first position adjuster, in which the head carriages 23, 26 move, in order to coincide the the directions with each other in which the head carriages 23, 26 move.

In other words, the second position adjuster is provided for adjusting to positionally align the moving areas of both heads 24 and 25 with each other such that they move In the same area once after the moving directions of both heads 24 and 25 were set to be paralleled with each other by means of the first position adjuster. More specifically, the operator can adjust the position of the base plate 87 by moving it in a direction intersecting with the moving direction (i.e., the radial direction of the disk 12) of the linear bearing 51 for the optical head 24 such that the moving area of the magnetic head 25 is to be included in a plane which is perpendicular to the disc surface and includes the moving area of the optical head 24 (that is, in the moving direction of the linear bearing 51 for the optical head 24), by means of the second position adjuster.

It should be noted that the movable direction of the base plate 87 is defined by the guide pin 100 and the guide groove 99. Accordingly, in the embodiment, the movable direction of the base plate 87 is arranged to be perpendicular to the moving direction of the linear bearing 51 for the optical head 24 (that is, to be perpendicular to the reference surface formed to the right side portion of tile optical head base 21).

The base plate 87 has screw holes 102a (see FIGS. 12 and 13) defined therein inwardly of the position adjusting holes 98. The permanent magnets 57a and the yokes 57b are fastened to the base plate 87 by screws 102 (see FIG. 11) threaded in the screw holes 102a.

Operation of the magneto-optical disk drive system 20 will be described below.

When the disk cartridge 11 with the magneto-optical disk 12 held therein is inserted into the cartridge holder 22, the loading switch 80 is turned on, and the drive motor 61 is energized for rotation in one direction. At this time, the disk cartridge 11 is in the unloading position and the magnetic head 25 is also in the unloading position. The rotation of the drive motor 61 is transmitted through the rack 59 to the guide cam plates 35, which then move in the direction B in FIG. 2.

During initial movement of the guide cam plates 35, the cam pins 36, 38 of the cartridge holder 22 are guided to move in and along the transfer portions 40b, 42b of the cam grooves 40, 42 to lower the disk cartridge 11 from the unloading position until the lower surface of the disk cartridge 11 abuts against upper surfaces 50a (see FIG. 2) of the guide rollers 50 which collectively serve as a reference surface. At the same time, the cam pins 37, 39 of the magnetic head carriage base 28 are guided to move in and along the transfer portions 41b, 43b of the cam grooves 41, 43 into the intermediate portions 41c, 43c, so that the magnetic head 25 is positioned in the intermediate or standby position between the unloading and loading positions, as shown. In FIGS. 3 and 6.

The switch trigger plate 60 that has moved with the guide cam plates 35 turns off the first and third detecting switches 65, 67 and turns on the second detecting switch 66. Therefore, the determining circuit determines, based on the output signals from the first, second, and third detecting switches 65, 66, 67, that the disk cartridge 11 is in the loading position and the magnetic head 25 is in the intermediate position allowing recorded information to be reproduced from the magneto-optical disk 12 in the reproducing mode (see FIG. 3).

In the reproducing mode, the optical head 24 reads an optical code signal written in an inner control track on the magneto-optical disk 12, and the disk determining circuit (see FIG. 1) determines whether the magneto-optical disk 12 is double-sided or single-sided based on the optical code signal thus read by the optical head 24. If the magneto-optical disk 12 is double-sided, then since the drive motor 61 is not energized and the guide cam plates 35 are not moved further, only desired Information is read from the magneto-optical disk 12 by the optical head 24 in the reproducing mode (see FIG. 3).

If the magneto-optical disk 12 is single-sided, then the drive motor 61 is energized again in the same direction as before to move the guide cam plates 35 further in the direction B. The magnetic head 25 is now fully lowered from the intermediate position into the loading position, allowing desired information to be recorded on and reproduced from the magneto-optical disk 12 in the recording/reproducing mode (see FIG. 4).

The first, second, and third position adjusters are assembled as follows: First, the base plate 87 is placed on the magnetic head carriage base 28 over the opening 112 with the cam pins 37, 39 inserted in the cam grooves 41, 43, 46, and the guide pins 100 are inserted respectively in the guide recesses 99. The screws 101 are inserted through the position adjusting holes 98 in the base plate 87 threadedly into the screw holes 120 in the magnetic head carriage base 28.

The magnetic circuits 57 are fastened by the screws 102 to the lower surface of the base plate 87 exposed downwardly through the opening 112. The linear bearing 55 is fastened to the base plate 87 by the screws 103 threaded through the position adjusting holes 113a into the screw holes 75a in the fixed member 75. The channel-shaped magnetic head carriage 26 is then fastened to the linear slider 76 of the linear bearing 55 by screws (not shown) threaded into the screw holes 76a in the linear slider 76. The magnetic head carriage 26 supports the coils 56 on its opposite sides which are movably fitted over the yokes 57b, the photosensors 30, 31 on one longitudinal end thereof, and the magnetic head 25 attached to the other longitudinal end thereof by the flexible arm 15.

In order to adjust the position of the magnetic head 25 relative to the optical head 24, at first in the first position adjuster, the two screws 103 of the first position adjuster are loosened, and then the fixed member 75 of the linear bearing 55 is moved so that tile magnetic head carriage 26 lies parallel to the optical head carriage 28, i.e., the linear slider 72. Thereafter, the screws 103 are tightened to secure the fixed member 75, i.e., the magnetic head carriage 26, to the magnetic head carriage base 28.

After the adjustment through tile first position adjuster was completed, the magnetic head carriage 26 and the optical head carriage 23 are moved to the respective terminal ends of the movable extents thereof (e.g., to the most outer periphery of the disk 12). Then, the sensor attachment base 152 is set to be positioned so that the outputs from the pair of position sensors 30 and 31 are to be equal to each other in the third position adjuster. Subsequently, the base 152 is temporarily fixed to its position by means of screw 150, thereby executing the rough adjustment of the relative position between the optical head carriage 23 and the magnetic head carriage 26.

Thereafter, the second adjustment through the second position adjuster and the third adjustment through the third position adjuster are repeated until that the magnetic head 25 precisely opposes to the optical head 24 with respect to the vertical direction. At first, the second adjustment through the second position adjuster is started. In the second adjustment.

(1): write the predetermined information on the magneto-optical disk 12 by means of the magnetic-field-modulated process;

(2): reproduce the information written on the disk 12 in (1);

(3): loose the screws 101 and move the base plate 87 by a predetermined distance;

(4) monitor a value that represents the magnitude of the reproduced signal;

(5) repeat the operations (1) through (4);

(6) determine the maximum magnitude value of the reproduced signal out of the values monitored; and (6) tighten the screws 101 and temporarily fix the base plate 87 at the position where the magnitude value of the reproduced signal is determined as the maximum value.

Then, the third adjustment through the third position adjuster is started. In the third adjustment, (a): write the predetermined information on the magneto-optical disk 12 by means of the magnetic-field-modulated process;

(b): reproduce the Information written on the disk 12 in (a);

(c): loose the screw 150 and move the base 152 by a predetermined distance;

(d) monitor a value that represents the magnitude of the reproduced signal;

(e) repeat the operations (a) through (d) one or more times;

(f) determine the maximum magnitude value of the reproduced signal out of the values monitored; and (g) tighten the screw 150 and temporarily fix the base 152 at the position where the magnitude value of the reproduced signal is determined as the maximum value.

The above-mentioned second and third adjustments are repeated. As a result of the repetition of the second and third adjustment procedures, when the maximum value of the maximum values which have been obtained from the step (f) is determined, the second and third adjustments are stopped. By fixing the base plate 87 and the base 152 at the position where the maximum value of the maximum values from step (f) is determined, the magnetic head 25 and the optical head 24 are vertically aligned with each other across the magneto-optical disk 12. And then, the screws 101 are tightened to securely fix the base plate 87 to the magnetic head carriage base 28 and the screws 150 are tightened to securely fix the sensor attachment base 152 to the magnetic head carriage 26, thereby executing the precise adjustment of the relative position between the optical head carriage 23 and the magnetic head carriage 26 in the vertical direction.

Consequently, the magnetic head carriage 26, i.e., the magnetic head 25, can easily be moved or positionally adjusted In different directions by the first, second, and third position adjusters, and can accurately and reliably be secured to the adjusted position.

The present disclosure relates to a subject matter contained in Japanese Utility Model Application Nos. HEI 4-78733, filed on Nov. 16, 1992, and HEI 5-46493, filed on Aug. 26, 1993, which are expressly incorporated herein by reference in their entireties.

What is claimed is:

1. A magneto-optical disk drive system, comprising:
a housing;
a cartridge holder disposed in said housing;
a disk cartridge for housing a magneto-optical disk therein, said disk cartridge being insertable in said cartridge holder;
an optical head carriage movably disposed in said housing and supporting an optical head;
a first linear motor supported in said housing for moving said optical head carriage in a first radial direction of the magneto-optical disk on one side of said cartridge holder;
a magnetic head carriage supporting a magnetic head;
a second linear motor supported in said housing for moving said magnetic head carriage in a second radial direction of the magneto-optical disk on an opposite side of said cartridge holder;
a pair of first and second position sensors supported respectively by the magnetic and optical head carriages, for detecting the relative position of the magnetic and optical head carriages;
a magnetic head carriage base supported in said housing on the other side of said cartridge holder for movement toward and away from said cartridge holder;
a base plate adjustably supported to said magnetic head carriage base;
first position adjusting means for positionally adjusting said magnetic head carriage with respect to said base plate in order to align said optical head carriage and magnetic head carriage such that they move in the same one direction;
second position adjusting means for moving said base plate with respect to said magnetic head carriage base to move said magnetic head carriage across the first and second radial directions as aligned by said first position adjusting means in order to adjust the first and second radial directions in which said magnetic head carriage and said optical head carriage move to coincide; and
third position adjusting means for moving said first position sensor with respect to said magnetic head carriage in order to vertically align said magnetic head and said optical head with each other.

2. The magneto-optical disk drive system according to claim 1, further comprising:
synchronizing means for energizing said first and second linear motors in synchronism with each other based on the relative position of the optical and magnetic head carriages as detected by said position sensors.

3. The magneto-optical disk drive system according to claim 1, wherein
said first position adjusting means includes:

at least one screw hole defined in one of said magnetic head carriage base and said base plate;
at least one position adjusting hole defined in the other of said magnetic head carriage base and said base plate; and
a screw extending through said position adjusting hole and threaded in said screw hole.

4. The magneto-optical disk drive system according to claim 3, wherein
said position adjusting hole is set to be larger in diameter than said screw hole.

5. The magneto-optical disk drive system according to claim 3, wherein
said screw hole is defined in said magnetic head carriage base, and
said position adjusting hole is defined in said base plate.

6. The magneto-optical disk drive system according to claim 1, wherein
said second position adjusting means includes:
at least one screw hole defined in one of said magnetic head carriage base and said base plate;
at least one position adjusting hole defined in the other of said magnetic head carriage base and said base plate;
a screw extending through said position adjusting hole and threaded in said screw hole; and
direction regulating means for regulating the moving direction of said base plate relative to the magnetic head carriage base in said one direction.

7. The magneto-optical disk drive system according to claim 6, wherein
said screw hole is defined in said magnetic head carriage base, and
said position adjusting hole is defined in said base plate.

8. The magneto-optical disk drive system according to claim 6, wherein
said direction regulating means includes:
guide recesses formed in one of said magnetic head carriage base and said base plate; and
guide pins attached in the other of said magnetic head carriage base and said base plate for slidably engaging in said respective guide recesses.

9. The magneto-optical disk drive system according to claim 8, wherein
said one direction is defined as a direction perpendicular to the moving direction of the optical head, and
said guide recesses and guide pins are separated in said one direction.

10. The magneto-optical disk drive system according to claim 1, wherein
said third position adjusting means includes:
a sensor attachment base to which said first position sensor is attached;
at least one screw hole defined in one of said first position sensor and said magnetic head carriage,
an elongated hole formed to said magnetic head carriage; and
a screw which is screwed to said sensor attachment base through said elongated hole.

11. The magneto-optical disk drive system according to claim 10, wherein
said elongated hole extends in the radial direction of said disk and in a predetermined direction perpendicular to the adjusting direction by said second position adjusting means.

12. A magneto-optical disk drive system, comprising:
a housing;
a disk cartridge for housing a magneto-optical disk therein, said disk cartridge being insertable into said housing;
an optical head disposed in said housing for movement in a first radial direction of the magneto-optical disk on one side thereof;
a magnetic head disposed in said housing for movement in a second radial direction of the magneto-optical disk on an opposite side thereof;
position sensor means coupled to said optical and magnetic heads, for detecting the relative position of the optical and magnetic heads;
first position adjusting means disposed in said housing for setting said first and second radial directions to be parallel with each other;
second position adjusting means disposed in said housing for adjusting said first and second radial directions to coincide with each other; and
third position adjusting means operationally coupled to said, position sensor means and disposed in said housing for positionally adjusting said position sensor means with respect to said optical head and said magnetic head along said first and second radial directions.

13. The magneto-optical disk drive system according to claim 12, further comprising:
a magnetic head carriage supporting a magnetic head;
a magnetic head carriage base supported in said housing for movement toward and away from said cartridge holder; and
a base plate adjustably fixed to said magnetic head carriage base, said magnetic head carriage being adjustably supported on said base plate.

14. The magneto-optical disk drive system according to claim 13, wherein
said first position adjusting means includes:
at least one screw hole defined in one of said magnetic head carriage base and said base plate;
at least one position adjusting hole defined in the other of said magnetic head carriage base and said base plate; and
a screw extending through said position adjusting hole and threaded in said screw hole.

15. The magneto-optical disk drive system according to claim 14, wherein
said position adjusting hole is set to be larger in diameter than said screw hole.

16. The magneto-optical disk drive system according to claim 14, wherein
said screw hole is defined in said magnetic head carriage base, and
said position adjusting hole is defined in said base plate.

17. The magneto-optical disk drive system according to claim 13, wherein
said second position adjusting means includes:
at least one screw hole defined in one of said magnetic head carriage base and said base plate;
at least one position adjusting hole defined in the other of said magnetic head carriage base and said base plate;
a screw extending through said position adjusting hole and threaded in said screw hole; and
direction regulating means for regulating the moving direction of said base plate relative to the magnetic head carriage base in said coinciding direction.

18. The magneto-optical disk drive system according to claim 17, wherein
said screw hole is defined in said magnetic head carriage base, and
said position adjusting hole is defined in said base plate.

19. The magneto-optical disk drive system according to claim 17, wherein
said direction regulating means includes:
guide recesses formed to one of said magnetic head carriage base and said base plate; and
guide pins attached to the other of said magnetic head carriage base and said base plate for slidably engaging in said respective guide recesses.

20. The magneto-optical disk drive system according to claim 19, wherein
said one direction is defined by a direction perpendicular to the moving direction of the optical head, and
said guide recesses and guide pins are separated in said one direction.

21. The magneto-optical disk drive system according to claim 13, wherein
said third position adjusting means includes:
a sensor attachment base to which said first position sensor is attached;
at least one screw hole defined in one of said first position sensor and said magnetic head carriage,
an elongated hole formed to said magnetic head carriage; and
a screw which is screwed to said sensor attachment base through said elongated hole.

22. The magneto-optical disk drive system according to claim 21, wherein
said elongated hole extends in the radial direction of said disk and in a direction perpendicular to the adjusting direction by said second position adjusting means.

* * * * *